United States Patent
Trainer et al.

(10) Patent No.: US 12,395,091 B2
(45) Date of Patent: Aug. 19, 2025

(54) ELECTRICAL POWER SYSTEM

(71) Applicant: ROLLS-ROYCE plc, London (GB)

(72) Inventors: David R. Trainer, Derby (GB); Mark Sweet, Chesterfield (GB); Gian Incerpi, Buckingham (GB); Jonathan M. Stevens, Bristol (GB)

(73) Assignee: ROLLS-ROYCE plc, London (GB)

( * ) Notice: Subject to any disclaimer, the term of this patent is extended or adjusted under 35 U.S.C. 154(b) by 153 days.

(21) Appl. No.: 18/488,386

(22) Filed: Oct. 17, 2023

(65) Prior Publication Data
US 2024/0146208 A1     May 2, 2024

(30) Foreign Application Priority Data
Nov. 2, 2022  (GB) ..................................... 2216246

(51) Int. Cl.
*H02M 5/42* (2006.01)
*B64D 27/02* (2006.01)
(Continued)

(52) U.S. Cl.
CPC .............. *H02M 5/42* (2013.01); *B64D 27/24* (2013.01); *H02M 1/32* (2013.01); *B64D 27/026* (2024.01); *B64D 27/10* (2013.01); *B64D 2221/00* (2013.01)

(58) Field of Classification Search
CPC .......... H02M 5/42; H02M 1/32; B64D 27/00; H02H 3/00; B60R 16/00
See application file for complete search history.

(56) References Cited

U.S. PATENT DOCUMENTS

| 9,800,171 B2 * | 10/2017 | Tahata | H02H 3/087 |
| 2006/0097519 A1 * | 5/2006 | Steinke | H02J 3/36 290/44 |

(Continued)

FOREIGN PATENT DOCUMENTS

| EP | 2091123 A2 | 8/2009 |
| GB | 2604364 A | 9/2022 |

(Continued)

OTHER PUBLICATIONS

European search report dated Mar. 20, 2024, issued in EP Patent Application No. 23201123.9.
(Continued)

*Primary Examiner* — Rexford N Barnie
*Assistant Examiner* — Joseph N Inge

(57) ABSTRACT

The disclosure relates to an electrical power system with current fault protection provided by current limiting diodes. Example embodiments include an electrical power system comprising: an electrical machine; an AC:DC power electronics converter connected to receive an input AC supply from the electrical machine and provide an output DC supply across first and second output terminals; a DC bus connected to first and second output terminals of the AC:DC power electronics converter; a load connected across the DC bus; a first circuit breaker switch and a first current limiting diode connected in series between the AC:DC power electronics converter and the DC bus; and a second circuit breaker switch and a second current limiting diode connected in series between the DC bus and the load, wherein the first current limiting diode is configured to limit current to a higher level than the second current limiting diode.

19 Claims, 10 Drawing Sheets

(51) Int. Cl.
  *B64D 27/10* (2006.01)
  *B64D 27/24* (2024.01)
  *H02M 1/32* (2007.01)

(56) References Cited

U.S. PATENT DOCUMENTS

| | | | | |
|---|---|---|---|---|
| 2009/0195954 A1* | 8/2009 | Sim | ............ | H02H 9/02 |
| | | | | 361/93.9 |
| 2009/0229847 A1* | 9/2009 | Long | ............ | H02H 9/08 |
| | | | | 174/6 |
| 2017/0306928 A1* | 10/2017 | Tahata | ............ | H02J 3/46 |
| 2018/0241202 A1 | 8/2018 | Mokhberdoran et al. | | |
| 2019/0363707 A1* | 11/2019 | Haugan | ............ | H02H 3/087 |
| 2021/0408779 A1 | 12/2021 | Chin et al. | | |
| 2023/0030964 A1* | 2/2023 | Horinouchi | ............ | B60R 16/03 |

FOREIGN PATENT DOCUMENTS

| | | |
|---|---|---|
| GB | 2604365 A | 9/2022 |
| GB | 2604366 A | 9/2022 |
| JP | H07336872 A | 12/1995 |
| WO | 2021210124 A1 | 10/2021 |

OTHER PUBLICATIONS

Great Britain search report dated Apr. 25, 2023, issued in GB Patent Application No. 2216246.5.

* cited by examiner

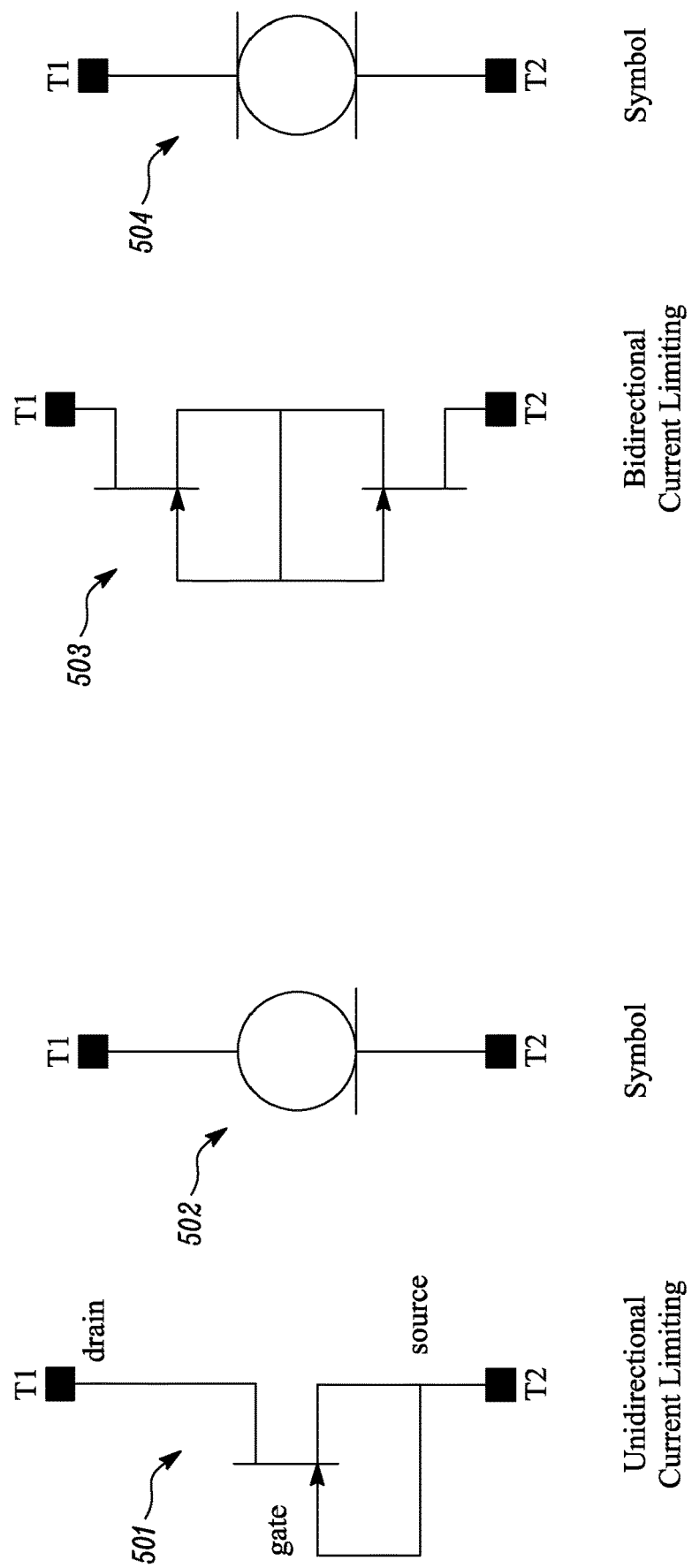

ELECTRICAL POWER SYSTEM

CROSS-REFERENCE TO RELATED APPLICATIONS

This specification is based upon and claims the benefit of priority from United Kingdom Patent Application No. 2216246.5, filed 2 Nov. 2022, the entire contents of which is incorporated herein by reference.

BACKGROUND

Technical Field

The disclosure relates to an electrical power system with current fault protection provided by current limiting diodes (CLDs).

Description of the Prior Art

In aerospace, the more electric engine (MEE) and more electric aircraft (MEA) concepts are seen as being increasingly attractive due to their potential to reduce fuel consumption. Such aircraft generally require a high voltage DC electrical network, operating with a DC bus voltage of for example around 270V or 540V. DC electrical networks of such aircraft are generally characterised by the low impedance of the transmission system and the presence of significant stored energy in DC link capacitors connected across power electronics converters, which operate to smooth fluctuations in the DC supply converted from AC generation or DC battery storage. During a fault condition that results in a short across the DC bus, energy stored in the DC link capacitors can be released extremely quickly, leading to very high pulses of current, which may for example be higher than 10,000 A, which flow through the electrical network and can affect all protection devices in the fault path.

Modern compact circuit breakers such as solid-state circuit breakers (SSCBs), solid state power controllers (SSPCs) and hybrid circuit breakers use semiconductor devices, typically MOSFETs, in the main current path which are generally intolerant of such high pulse current stresses. It is normal therefore for desaturation protection associated with such transistors to turn off the devices. The effect of this is that semiconductor-based circuit breakers will operate immediately. Unfortunately, this means the protection system will operate to also disconnect any healthy parts of the electrical network at the same time as the faulted parts, making fault discrimination not possible. It is an object of the invention to address this problem.

SUMMARY

According to a first aspect there is provided an electrical power system comprising:
an electrical machine;
an AC:DC power electronics converter connected to receive an input AC supply from the electrical machine and provide an output DC supply across first and second output terminals;
a DC bus connected to first and second output terminals of the AC:DC power electronics converter;
a load connected across the DC bus;
a first circuit breaker switch and a first current limiting diode connected in series between the AC:DC power electronics converter and the DC bus; and
a second circuit breaker switch and a second current limiting diode connected in series between the DC bus and the load,
wherein the first current limiting diode is configured to limit current to a higher level than the second current limiting diode.

The use of current limiting diodes (CLDs) within the electrical network having different current limiting, or saturation, characteristics allows for a fault current to be limited by a CLD nearest to the fault. By detecting which CLD is dominating the current limiting action, it is possible to identify the location of the fault and use this information to open a local switch to only disconnect the faulty part of the network. This provides an efficient method of discrimination which can act quickly to locate and isolate a fault within a DC network, while allowing other parts of the network to continue operating.

The electrical power system may comprise a controller configured to measure a voltage across the first and second current limiting diodes and operate the first and second circuit breaker switches dependent on the measured voltage across the first and second current limiting diodes.

The controller may be configured to open the first circuit breaker switch if the measured voltage across the first current limiting diode exceeds a first threshold voltage and to open the second circuit breaker switch if the measured voltage across the second current limiting diode exceeds a second threshold voltage.

The first and second current limiting diodes may each comprise one or more JFETs. The controller may be configured to measure a drain-source voltage across each of the one or more JFETs.

Each of the first and second current limiting diodes may comprise a plurality of JFETs connected in parallel.

The controller may be configured to provide a gate-source voltage to each of the one or more JFETs of each of the first and second current limiting diodes.

The first and second current limiting diodes may be unidirectional or bidirectional current limiting diodes.

According to a second aspect there is provided a method of operating an electrical power system comprising:
an electrical machine;
an AC:DC power electronics converter connected to receive an input AC supply from the electrical machine and provide an output DC supply across first and second output terminals;
a DC bus connected to first and second output terminals of the AC:DC power electronics converter;
a load connected across the DC bus;
a first circuit breaker switch and a first current limiting diode connected in series between the AC:DC power electronics converter and the DC bus; and
a second circuit breaker switch and a second current limiting diode connected in series between the DC bus and the load, the first current limiting diode being configured to limit current to a higher level than the second current limiting diode,
the method comprising:
measuring a voltage across the first and second current limiting diodes;
opening the first circuit breaker switch if the measured voltage across the first current limiting diode exceeds a first threshold voltage; and
opening the second circuit breaker switch if the measured voltage across the second current limiting diode exceeds a second threshold voltage.

The electrical power system may comprise a controller configured to measure the voltage across the first and second current limiting diodes and to operate the first and second circuit breaker switches dependent on the measured voltage across the first and second current limiting diodes.

The first and second current limiting diodes may each comprise one or more JFETs. The controller may measure a drain-source voltage across each of the one or more JFETs. Each of the first and second current limiting diodes may comprise a plurality of JFETs connected in parallel.

The controller may provide a gate-source voltage to each of the one or more JFETs of each of the first and second current limiting diodes.

The first and second current limiting diodes may be unidirectional or bidirectional current limiting diodes.

According to a third aspect there is provided an aircraft power and propulsion system comprising:
a gas turbine engine; and
an electrical power system according to the first aspect, wherein the electrical machine of the electrical power system is mechanically coupled with a spool of the gas turbine engine.

According to a fourth aspect there is provided an aircraft comprising the electrical power system according to the first aspect or the power and propulsion system according to the third aspect. The aircraft may be a hybrid electric aircraft.

According to a fifth aspect, there is provided an electrical power system comprising:
an electrical machine;
an AC:DC power electronics converter having an AC side and a DC side, the AC side connected to the electrical machine and the DC side connected across first and second terminals;
a DC bus connected to first and second terminals of the AC:DC power electronics converter;
a load connected across the DC bus;
a first circuit breaker switch and a first current limiting diode connected in series between the AC:DC power electronics converter and the DC bus; and
a second circuit breaker switch and a second current limiting diode connected in series between the DC bus and the load,
wherein the first current limiting diode is configured to limit current to a higher level than the second current limiting diode.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which:

FIGS. 5A and 5B illustrate circuit diagrams and corresponding symbols for unidirectional and bidirectional JFET-based current limiters;

DETAILED DESCRIPTION

FIG. 1

Figure 1:
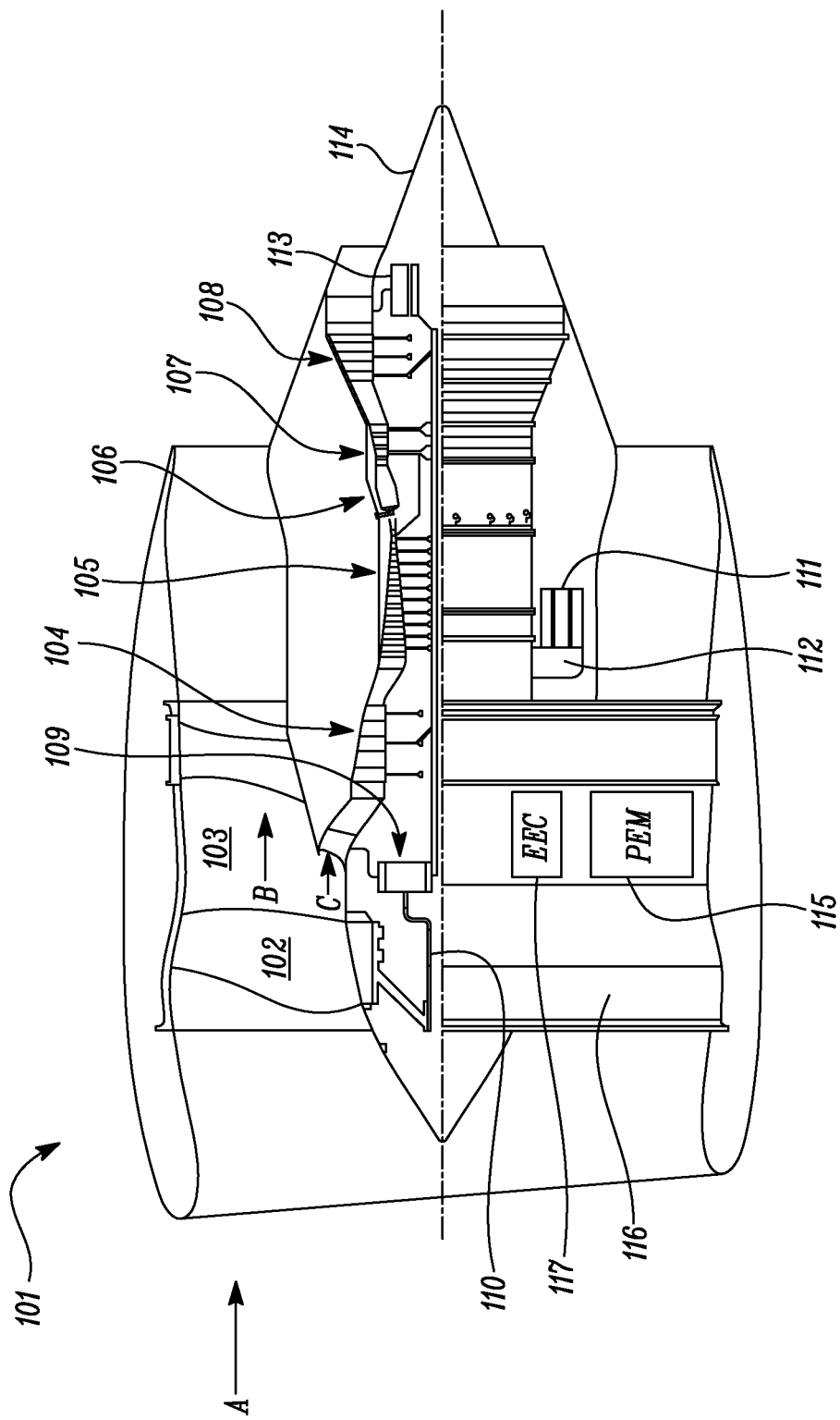
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of FIG. 1 comprises one or more rotary electrical machines, generally capable of operating both as a motor and as a generator. The number and arrangement of the rotary electrical machines will depend to some extent on the desired functionality. Some embodiments of the engine 101 include a single rotary electrical machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electrical machine 111 coupled with the high pressure spool and a second rotary electrical machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electrical machine 111 is driven by the high-pressure spool by a core-mounted accessory drive 112 of conventional configuration. In alternative embodiments, the first electrical machine 111 may be mounted coaxially with the turbomachinery in the engine 101. For example, the first electrical machine 111 may be mounted axially in line with the duct between the low- and high-pressure compressors 104 and 105. In FIG. 1, the second electrical machine 113 is mounted in the tail cone 114 of the engine 101 coaxially with the turbomachinery and is coupled to the low-pressure turbine 108. In alternative embodiments, the second rotary electrical machine 113 may be located axially in line with low-pressure compressor 104, which may adopt a bladed disc or bladed drum configuration to provide space for the second rotary electrical machine 113. It will of course be appreciated by those skilled in the art that any other suitable location for the first and (if present) second electrical machines may be adopted.

The first and second electrical machines 111, 113 are connected with power electronics. Extraction of power from or application of power to the electrical machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electrical machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e. both of the core gas turbine and the first and second electrical machines 111 and 113. In this way, the EEC 117 may holistically respond to both thrust demand and electrical power demand.

The one or more rotary electrical machines 111, 113 and the power electronics 115 may be configured to output to or receive electric power from one, two or more dc busses. The dc busses allow for the distribution of electrical power to other engine electrical loads and to electrical loads on the airframe.

Those skilled in the art will appreciate that the gas turbine engine 101 described above may be regarded as a 'more electric' gas turbine engine because of the increased role of the electrical machines 111, 113 compared with those of conventional gas turbines.

Figure 2A:
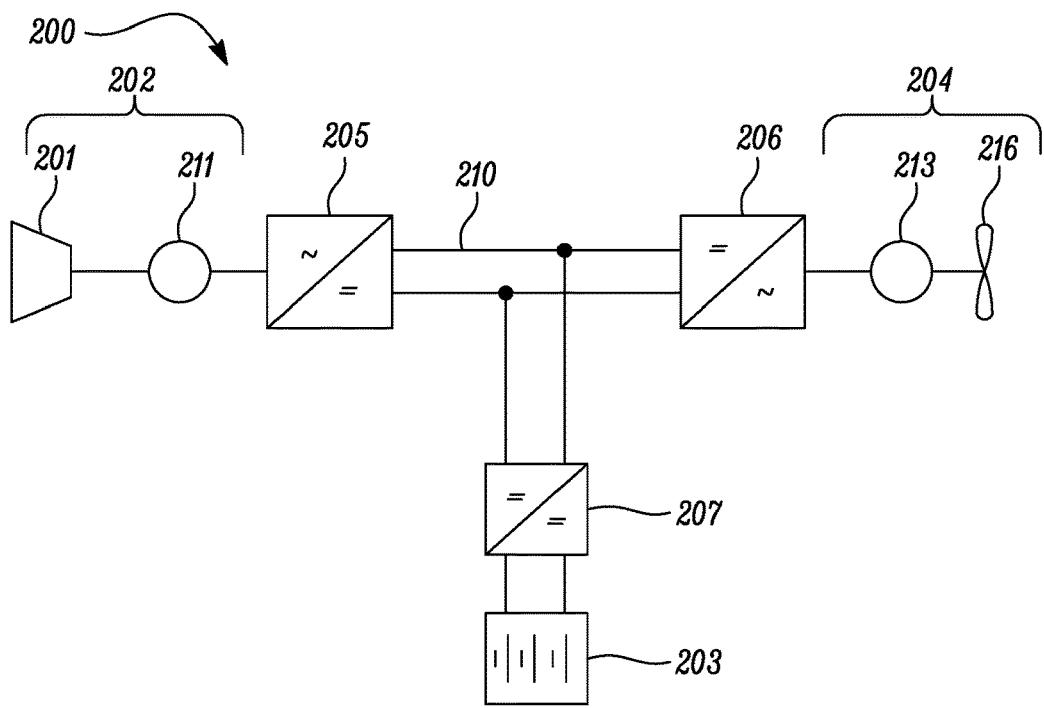
FIG. 2A is a schematic illustration of a hybrid electric aircraft propulsion system.
Figure 2B:
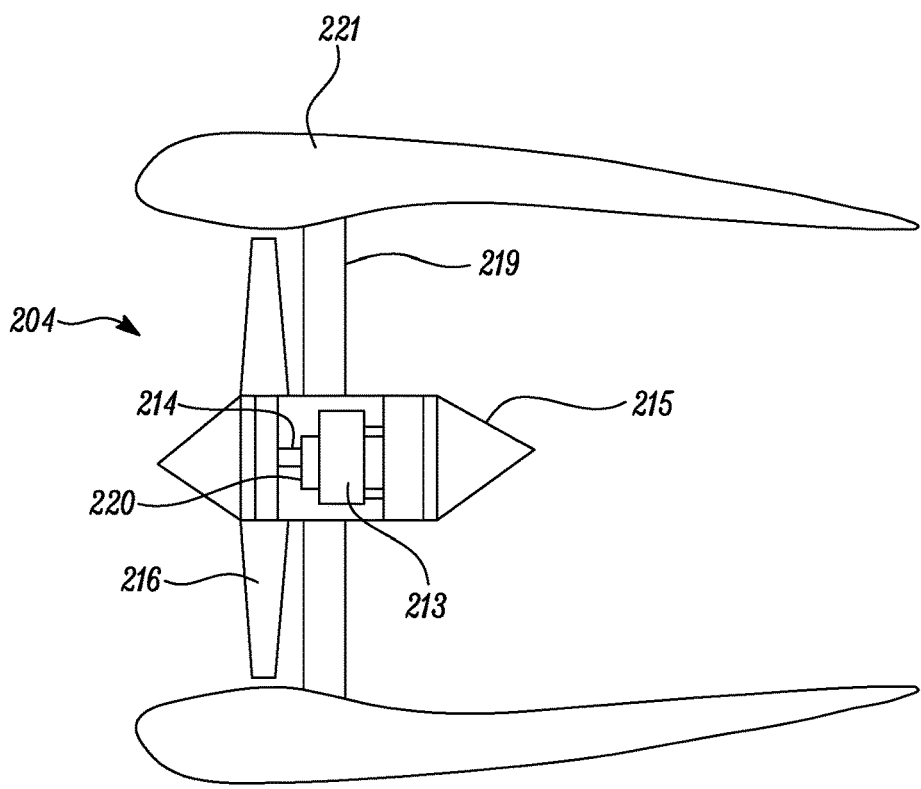
FIG. 2B illustrates an electrically powered propulsor such as may be used in a hybrid electric propulsion system.

FIGS. 2A and 2B

FIG. 2A illustrates an exemplary propulsion system 200 of a hybrid electric aircraft. The propulsion system 200 includes a generator set 202 comprising a gas turbine engine 201 and electrical generator 211, and a battery pack 203. Both the generator set 202 and the battery pack 203 are used as energy sources to power a motor-driven propulsor 204, an example of which is shown in FIG. 2B.

The illustrated propulsion system 200 further comprises an AC/DC converter 205, a dc distribution bus 210, a DC/AC converter 206 and a DC/DC converter 207. It will be appreciated that whilst one generator set 202 and one propulsor 204 are illustrated in this example, a propulsion system 200 may include more than one generator set 202 and/or one or more propulsor 204.

A shaft or spool of the engine 201 is coupled to and drives the rotation of a shaft of the generator 211 which thereby produces alternating current.

The AC/DC converter 205, which faces the generator 211, converts the alternating current into direct current which is fed to various electrical systems and loads via the dc distribution bus 210. These electrical systems include non-propulsive loads (not shown in FIG. 2A) and the motor-driven propulsor 204, which comprises a motor 213 which drives a propulsor 204 via the DC/AC converter 206.

The battery pack 203, which may be made up of a number of battery modules connected in series and/or parallel, is connected to the dc distribution bus 210 via the DC/DC converter 207. The DC/DC converter 207 converts between a voltage of the battery pack 203 and a voltage of the dc distribution bus 210. In this way, the battery pack 203 can replace or supplement the power provided by the generator set 202 (by discharging and thereby feeding the DC distribution bus 210) or can be charged using the power provided by the generator set 202 (by being fed by the dc distribution bus 210).

Referring to FIG. 2B, in this example the propulsor 204 takes the form of a ducted fan. The fan 216 is enclosed within a fan duct 219 defined within a nacelle 221 and is mounted to a core nacelle 215. The fan 216 is driven by the electrical machine 213 via a drive shaft 214, both of which may also be thought of as components of the propulsor 204. In this embodiment a gearbox 220 is provided between the electrical machine 213 and the drive shaft 214.

The electrical machine 213 is supplied with electric power from a power source, for example the generator set 202 and/or the battery 203 via the dc bus 210. The electrical machine 213 of the propulsor, and indeed the electrical machine 211 of the generator set 202, may be of any suitable type, for example of the permanent magnet synchronous type.

Those skilled in the art will recognise the propulsion system 200 of FIGS. 2A-B to be of the series hybrid type.

Other hybrid electric propulsion systems are of the parallel type, while still others are of the turboelectric type or have features of more than one type. The configuration of the more electric engine 101 of FIG. 1 may be considered similar to a parallel hybrid system, with the main distinction being the roles of the electrical machines. For example, the electrical machines of a more electric engine are generally only used in motor mode to start the engine and to improve engine operability, whereas the electric machines of a parallel hybrid propulsion system are used to motor the spools to meaningfully add to the amount of propulsive thrust produced by the turbomachinery.

FIG. 3

Figure 3:
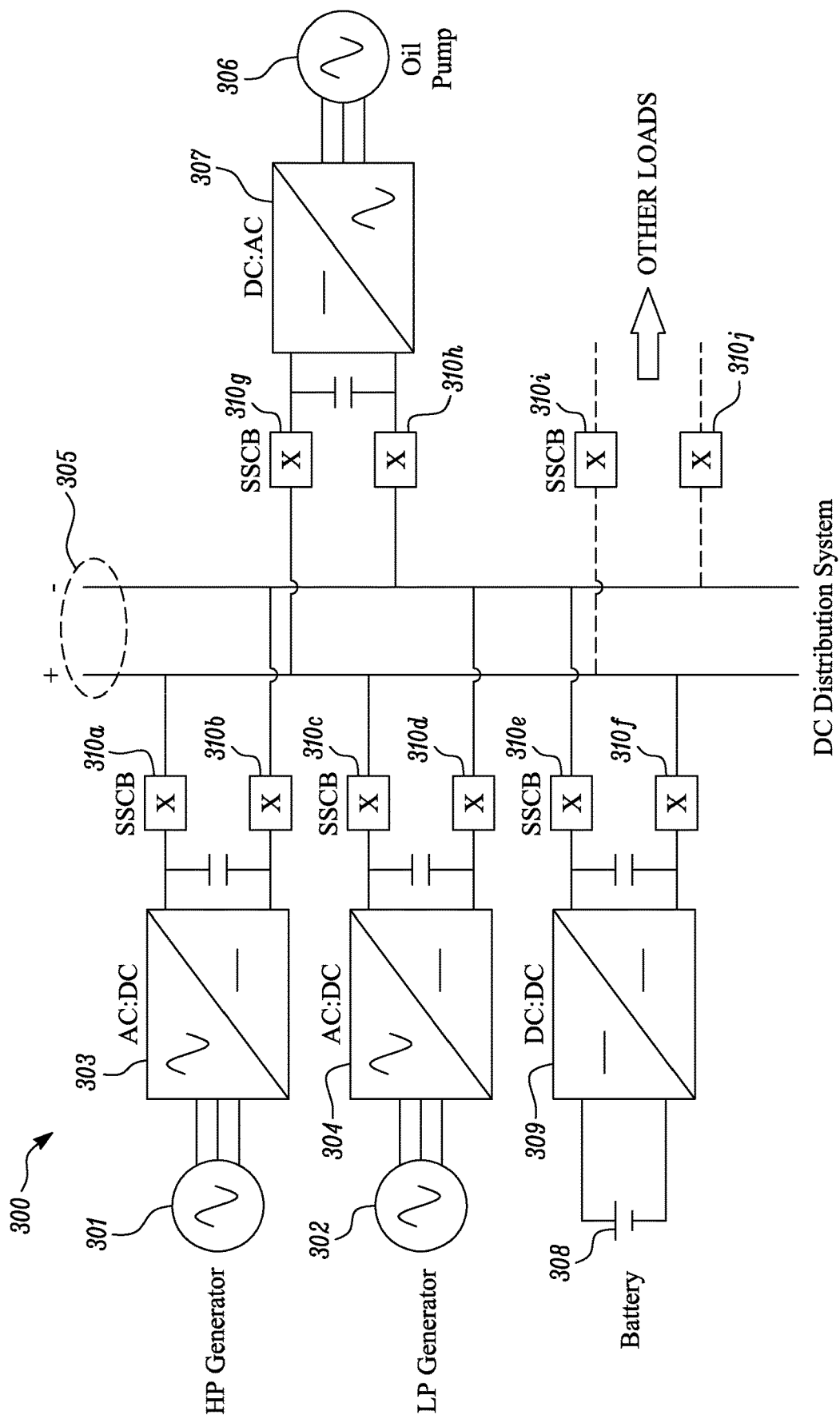
FIG. 3 is a schematic diagram of an example electrical power system.

FIG. 3 is a schematic diagram illustrating an example aircraft electrical power distribution system 300 in which power is provided by generators 301, 302 connected to the HP and LP spools respectively of a gas turbine engine used for propulsion of the aircraft. The generators 301, 302 are connected to AC inputs of respective AC:DC converters 303, 304, which have DC outputs connected to a DC bus 305. The DC bus 305 provides DC power to one or more loads, such as an oil pump 306 shown in FIG. 3, each load being connected via a DC:AC converter 307.

A battery-based energy storage system 308 is connected to the DC bus 305 via a DC:DC converter 309. The battery 308 allows electrical power to be transferred between the battery 308 and the DC bus 305 as required, for example to temporarily supplement or replace power from the generators 301, 302 or to store energy provided by the generators 301, 302 for future use.

Each of the converters 303, 304, 309 is connected to the DC bus 305 via a solid-state circuit breaker (SSCB) 310a-f in both the positive and negative side of the DC bus 305. In some applications it may only be necessary to provide a circuit breaker in one side of the DC bus to effect fault current interruption and isolation. Similarly, each load 306 is connected to the DC distribution system using an SSCB 310g-j. The SSCBs provide a means of isolating each power source and each load from the electrical power system as required and may be used during normal operation to optimise and reconfigure the network components or to isolate faulty sources or loads. There may be other SSCBs associated with the distribution system to enable, for example, faulty cables to be isolated. The solid-state circuit breaker could be replaced with a solid-state power controller or hybrid solid-state/mechanical circuit breaker as necessary.

FIG. 4

Figure 4:
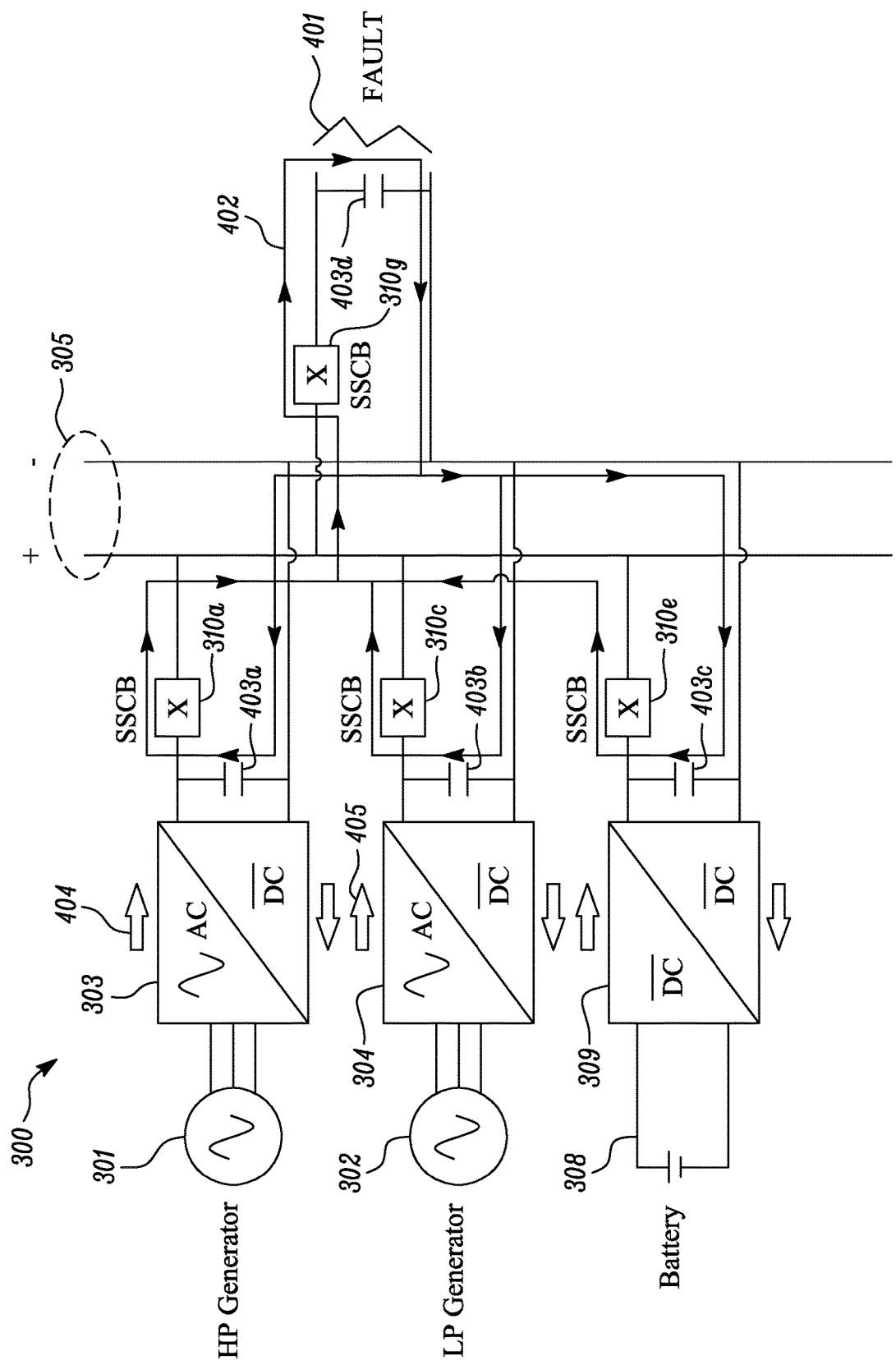
FIG. 4 is a schematic diagram of the electrical power system of FIG. 3 responding to a load fault.

FIG. 4 illustrates the system 300 of FIG. 3 in which an initial response is underway to a low impedance fault at the electric oil pump 306, which in FIG. 4 is replaced by a short circuit fault 401. It can be seen that all SSCBs 310a,c,e,g in the positive DC lines experience an immediate and high pulse of fault current 402 contributed by the AC:DC and DC:DC converter DC link capacitors 403a-d. Although not shown in FIG. 4, SSCBs in the negative DC line, if present, would also experience the same high pulse of fault current 402.

It is understood that the DC capacitors 403a-d will discharge very high pulse currents, which will flow through all SSCBs 310 in the fault path as shown in FIG. 4. In this situation, the SSCBs and any other type of circuit breaker using semiconductors may experience current magnitudes well above their rated current value. To protect these devices, each SSCB may be configured to immediately turn off its semiconductors by virtue of its local desaturation protection. This would lead to all SSCBs opening, stopping the fault current flowing. Unfortunately, this action results in all generation being removed from any other healthy loads connected to the DC distribution bus 305, which is not necessarily desirable. With healthy parts of the network being unnecessarily disconnected in this way, it is normal practice for the electrical network designer to provide additional power channels to ensure the electrical system as a whole can operate effectively with the loss of some of its generation sources. This multi-channel approach inherently leads to additional complexity with increased weight and cost, which is particularly problematic for aerospace applications.

Also illustrated in FIG. 4 are longer-term fault current contributions 404, 405 from the HP and LP generators 301, 302, which may be designed with a high impedance to limit their fault current contribution. The generators 301, 302 may for example be designed to have an impedance of 1.0 per unit such that their fault current settles to 1.0 per unit. If, for example, the rated current for a generator is 200 A, a fault current limit of 1.0 per unit will limit the fault current to 200 A.

The HP and LP generators 301, 302 can either be allowed to contribute to the fault current or may be controlled into their crow-bar state using the associated AC:DC converter 303, 304. The battery 308, however, will tend to have a relatively low impedance and may contribute large fault currents of the order of thousands of Amperes. It is normal practice to prevent the battery 308 from supplying a longer-term fault current by using a DC:DC converter 309 with DC fault blocking capability or by immediately opening its series SSCB 310e.

FIG. 4 highlights a significant problem with the implementation of a credible protection system because fault discrimination is not available. One solution is to add inductance in series with some or all of the DC capacitors 403a-d. This inductance acts to increase the surge impedance [$\sqrt{(L/C)}$] of each current loop, which in turn reduces the peak discharge current contributed by the capacitors 403a-d as they discharge their energy and can serve to protect the SSCB semiconductors, allowing them to ride through the fault. However, generally this is not a practical solution for aerospace applications because such inductors tend to be big and heavy components for high power applications and, in practice, multiple inductors will be required to provide a reasonable level of fault discrimination.

FIG. 5

An alternative approach proposed herein is instead to provide a more compact and lightweight way of limiting the initial high discharge current from multiple DC link capacitors and also the longer-term fault current that is contributed from the rotating generators and batteries. This current limiting action allows semiconductor and other protection devices to remain connected. The proposed approach additionally provides a method of identifying the location of a fault so that only faulty parts of the system may be disconnected, thus providing a means of discrimination.

The proposed solution is based around either unidirectional or bidirectional semiconductor based current limiting diodes (CLDs), examples of which are illustrated schematically in FIG. 5. Such devices may be constructed using JFETs (junction-gate field-effect transistor), in which the gate and source of the transistor may be joined together. FIG. 5A illustrates a unidirectional JFET 501 and its corresponding symbol 502. FIG. 5B illustrates a bidirectional JFET 503 and its corresponding symbol 504.

The JFET is normally in an on-state when zero voltage is applied between the gate and source and exhibits a current limiting or constant current action. Both Silicon (Si) and Silicon Carbide (SiC) CLDs are available commercially as discrete devices. Other advanced semiconductor materials like Gallium Nitride (GaN) are also being proposed that may enable ratings consistent with the requirements of aerospace electrical systems to become more practical.

The solution proposed herein involves using CLDs in place of inductors to provide almost instantaneous current limiting action in the presence of DC capacitor discharge as a result of a short circuit fault current occurring. Due to the physics of operation, saturation is achieved by channel pinch-off as a function of the voltage/current loci. Current saturation can therefore occur within timeframes as short as a few nanoseconds. CLDs, being semiconductor based, can only provide a short-term current limiting action, which is constrained by the device junction temperature. Nevertheless, CLDs can be relatively small and lightweight components compared to the use of large bulky and heavy inductors and can therefore be used to implement a practical protection scheme and strategy operating in the millisecond time frame. With this example, an adequately rated CLD would enter current saturation and be used to isolate the faulty component almost instantaneously, without having to affect other circuitry applied to the network.

FIG. 6

Figure 6A:
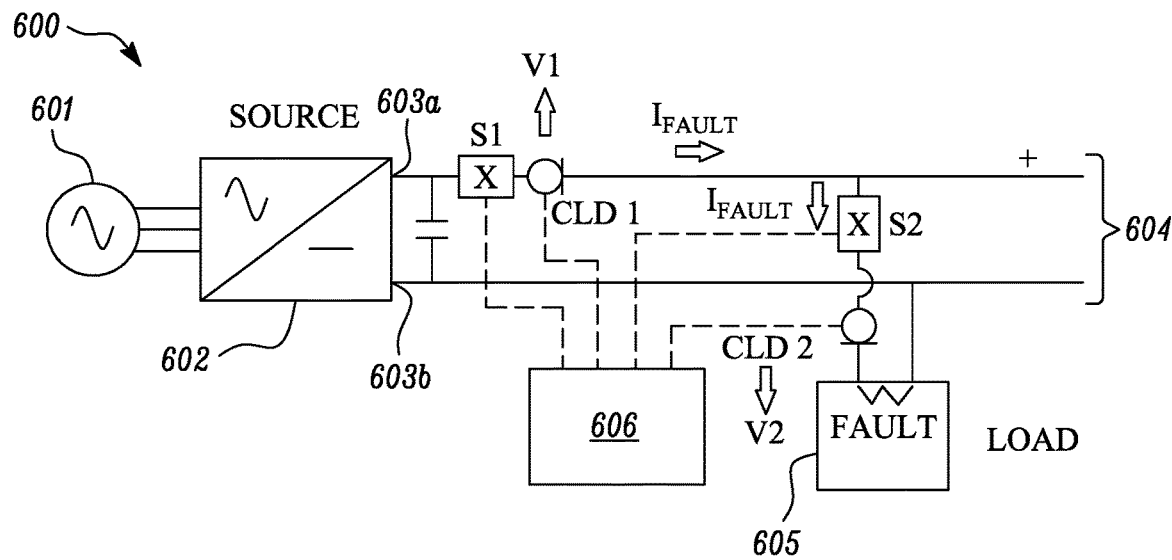
FIG. 6A is a schematic diagram of an example electrical power system with first and second current limiting diodes having differing saturation characteristics.

FIG. 6A illustrates an example electrical power system 600 using CLDs for fault current protection. The system 600 comprises an electrical machine 601, which may for example be a generator driven by a spool of a gas turbine engine, connected to an AC:DC power electronics converter 602. The converter 602 is configured to receive an input AC supply from the electrical machine 601 and provide an output DC supply across first and second terminals 603a, 603b. The AC:DC power electronics converter may also be configured to operate in reverse, i.e. taking a DC supply at the first and second terminals 603a, 603b and provide an AC output to the electrical machine 601. The AC supply or output may be single phase or multiple phase, typically 3 phase.

A DC bus 604 is connected to the first and second output terminals 603a, 603b of the AC:DC power electronics converter 602. A load 605 is connected across the DC bus 604. The load 604 may for example be of the type described above in FIG. 3, i.e. with a DC:AC converter and an AC load such as electric motor for an oil pump or other purpose. The load may alternatively be a DC load, which may be connected via a DC:DC converter, for example a battery. As with the example in FIG. 3, other loads and other sources may also be present, such as one or more further generators, batteries and other loads connected to the DC bus 604.

A first circuit breaker switch S1 and a first current limiting diode CLD1 are connected in series between the converter 602 and the load 605. A second circuit breaker switch S2 and a second current limiting diode CLD2 are connected in series between the DC bus 604 and the load 605. The switches S1, S2 and CLDs CLD1, CLD2 are in this example connected to the positive side of the DC bus 604.

Figure 6B:
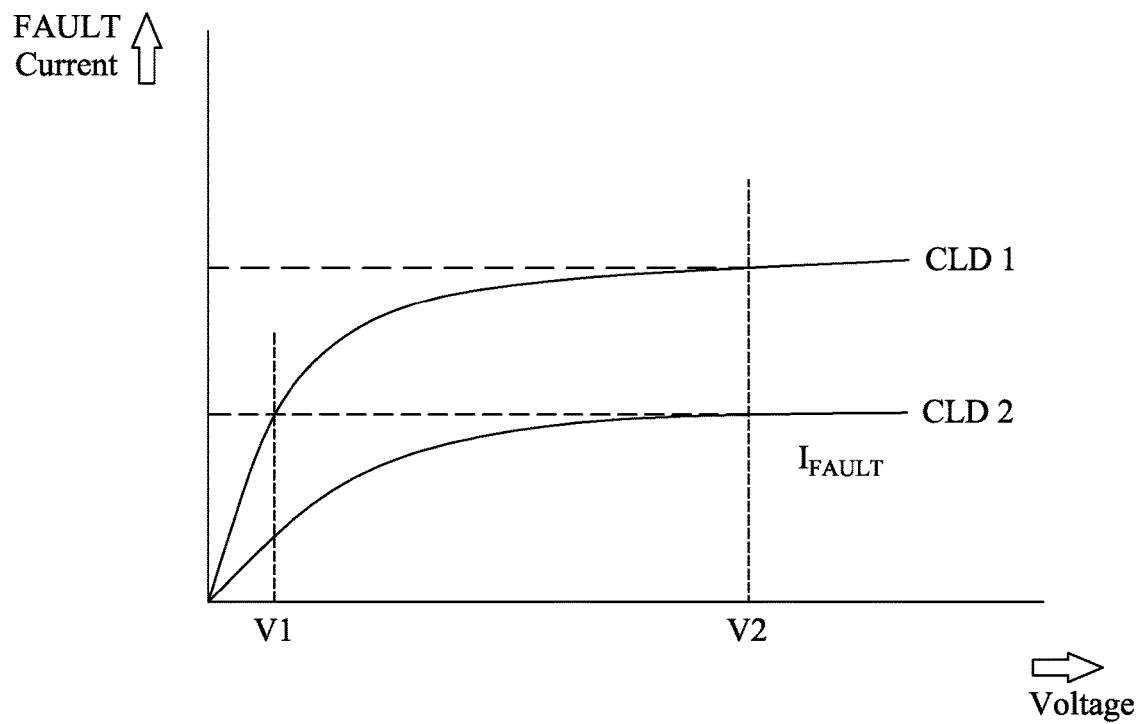
FIG. 6B is a plot of fault current as a function of voltage for the first and second current limiting diodes of FIG. 6A.

FIG. 6B illustrates schematically the current to voltage relationships for the first and second current limiting diodes CLD1, CLD2. CLD1 is configured to limit current to a higher level than CLD2. The result of this is that the drain-source voltage Vds across CLD1 at a given fault current $I_{FAULT}$ will be lower than that across CLD2, as illustrated in FIG. 6B where the drain-source voltage V1 is measured across CLD1 while a higher drain-source voltage V2 is measured across CLD2 at the same fault current $I_{FAULT}$. This difference in current limiting behaviour allows a controller 606 to operate the circuit breaker switches S1, S2 selectively. In this example, a higher voltage will be measured by the controller 606 across CLD2 than CLD1. The controller 606 can be configured to open the second circuit breaker switch S2 while leaving the first circuit breaker switch S1 closed, thereby isolating the fault across the load 605. In a general aspect therefore, the controller 606 may be configured to measure a voltage V1, V2 across the first and second current limiting diodes CLD1, CLD2 and operate the first and second circuit breaker switches S1, S2 dependent on the measured voltage across the first and second current limiting diodes CLD1, CLD2. If a measured voltage above a threshold voltage is exceeded, the controller causes the corresponding circuit breaker switch to open.

The controller 606 may be configured to operate the first circuit breaker switch S1 if the measured voltage across the first current limiting diode CLD1 exceeds a first threshold voltage and to operate the second circuit breaker switch S2 if the measured voltage across the second current limiting diode CLD2 exceeds a second threshold voltage. The first and second threshold voltages may be the same or different.

As described above, the current limiting devices CLD1, CLD2 may each comprise one or more JFETs. The system 600 may use CLDs with a lower saturation current as the distance from the generator increases. In the example in FIGS. 6A and 6B, CLD2 connected to the load 605 has a lower saturation current compared to CLD1 connected at the source. In the event of a low impedance fault at the load, the DC capacitor voltage, which may for example be charged to 540 VDC, is instantaneously applied across CLD1 and CLD2 in series. Here the current limiting action is dominated by CLD2, which has the lower current saturation characteristic. As such, CLD2 supports a higher voltage V2, i.e. most of the applied 540V, with CLD1 supporting a much lower voltage V1 and remaining in its non-limiting linear region.

While CLD2 is limiting current, it supports both high voltage and high current and is therefore dissipating significant power. This dissipation increases the junction temperature of CLD2, which has the positive impact of reducing the fault current further due to the negative coefficient of drain current as a function of temperature. Reducing the fault current means that CLD1 now experiences less current and moves further down into its linear region supporting less of the total applied voltage. This drives the voltage sharing such that CLD2 supports more voltage as the device gets hot, which further aids in fault location detection.

By grading the CLD saturation characteristics in this way, the CLD nearer or nearest to the fault will tend to support a higher voltage than those further away from the fault. Therefore, measuring the relative voltages of the CLDs in the network provides a simple means of detecting the location of a fault. Using this CLD voltage information to only operate circuit breakers in zones where high CLD voltage is detected can allow only those parts of the system that require isolation to be disconnected.

In practice, a CLD may reach saturation in a few nanoseconds. In response to the increased drain-source voltage, the circuit breaker switch may be operated by the controller within a few microseconds. Mechanical contactors may be used to provide galvanic isolation, i.e. providing a physical break in the circuit, but operate in a longer 10-20 ms timeframe, meaning that the CLD would need to be able to withstand high fault currents for a longer period.

In the simplified example in FIG. 6A, a fault at the generator would cause CLD1 to dominate the current limiting action, which would lead to switch S1 being opened. In all cases the CLD cools down once it stops conducting and the device stops limiting such that the isolated load or other part of the network could be reconnected if desired. This offers a fully resettable system allowing auto-reclose strategies to be applied if desired, for example in which a faulty load can be reconnected and subsequently disconnected if a fault persists.

FIG. 7

Figure 7B:
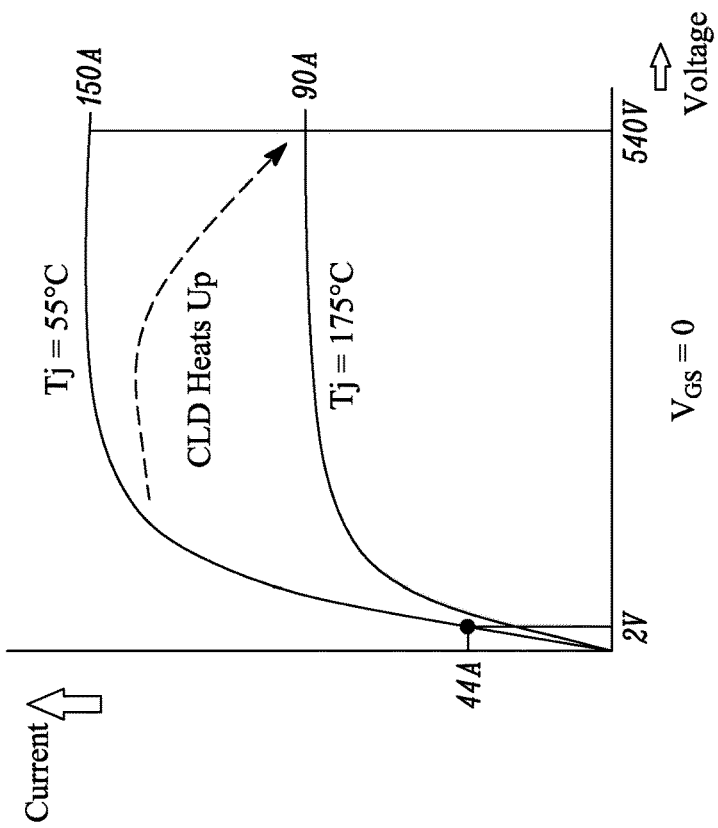
FIG. 7B is a schematic plot of current as a function of voltage for a pair of JFET current limiting diodes arranged in parallel.
Figure 7A:
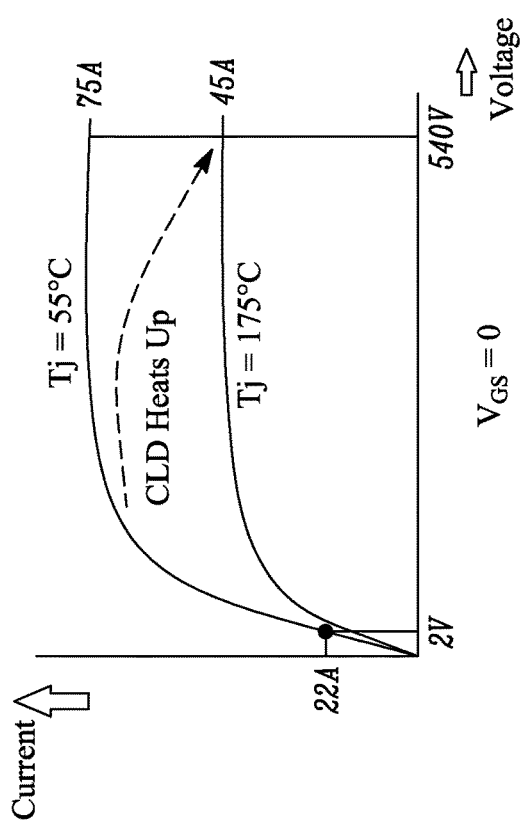
FIG. 7A is a schematic plot of current as a function of voltage for a single JFET current limiting diode.

One way of altering the saturation characteristics of each CLD is to vary the number of parallel connected devices making up each CLD. As a simple illustration, FIG. 7 shows how connecting two parallel devices or dies impacts on the current saturation characteristic. FIG. 7A illustrates the current to voltage relationship for a single JFET with a zero gate-source voltage at two different temperatures of 55° C. and 175° C., the lower of these temperatures being typical of normal operational mode and the higher an example of a temperature that may be reached during a fault current. During normal operating conditions, the CLD may carry around 22 A and have a drain-source voltage of around 2V. As the CLD heats up when carrying a higher fault current, its saturation characteristic changes and the current limit is reduced. FIG. 7B illustrates the current-voltage characteristic of two such JFETs connected in parallel, with the current carrying capacity effectively doubled and with the same behaviour during a fault current.

In practice, the number of parallel dies may typically vary between around 10 and 20 to provide current ratings of between 220 A and 440 A [~120 kW and ~240 kW@540 VDC] during normal operation and may be higher as required. It should be noted that when connecting such devices in parallel, some de-rating should be provided for current sharing errors such that the overall current rating of a large number of die may be practically reduced by perhaps 5%-10% dependent on the layout and packaging methods used. Nevertheless, simple paralleling provides a practical means of controlling the current saturation characteristic.

FIG. 8

Figure 8:
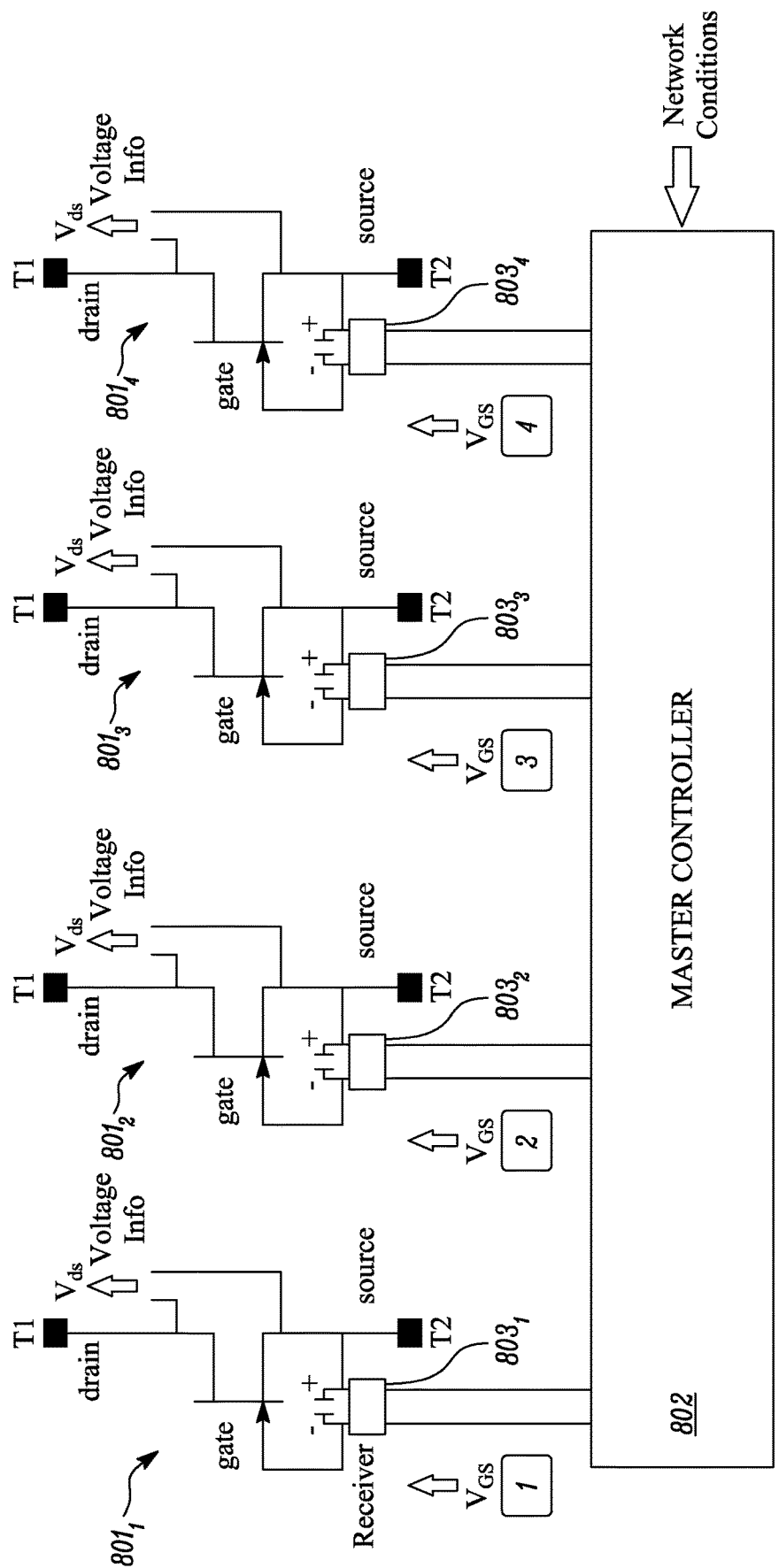
FIG. 8 is a schematic circuit diagram illustrating a plurality of voltage controlled JFET current limiting diodes.

A 2-terminal CLD of the type shown in FIG. 5 may be tuned by varying the number of parallel dies to provide the required current carrying capacity and fault discrimination discussed above. A further option to vary the saturation characteristic of each device is by actively varying the gate-source voltage $V_{GS}$ applied to each JFET, rather than connecting the gate and source together such that $V_{GS}$=0. FIG. 8 illustrates an example in which the gate-source voltages of multiple unidirectional JFET CLDs $801_{1-4}$ are controlled by a controller 802. The controller 802 may be part of the controller 606 described above or may be a separate unit. The controller 802 may control the gate-source voltage of each of the CLDs $801_{1-4}$ dependent on network conditions such that the CLD saturation characteristics may be dynamically adjusted to suit the requirements of the network or to reconfigure the arrangement of JFETs to cater for failures and disconnection of parts of the network. For example, the current saturation characteristics could change dependent on which of the HP, LP and Battery sources (shown in FIG. 3) are connected.

There are various schemes in which the gate-source voltage of each JFET could be changed. In its simplest form the controller 802 may apply an analogue voltage to each CLD of the appropriate value. Other methods include the use of a frequency to voltage converter at each JFET so that the control could be achieved digitally, or an optical to voltage converter used to provide isolation. In the example illustrated in FIG. 8, a receiver circuit $803_{1-4}$ is provided at each JFET to convert the control signals to an appropriate gate-source voltage $V_{GS}$. It is understood that both variation of the number of parallel dies and control of $V_{GS}$ to each CLD could be used together to tune the saturation characteristics. In the limit, control of each JFET gate-source voltage could be further modified once it is identified as being the device dominating the current limiting action so that the JFET is fully turned off by gate control, i.e. transitioning from current limiting to current interruption mode. This extinction of fault current by JFET control could support fault isolation by a mechanical contactor so that the contactor is opened at zero current, which prevents arcing.

Figure 9:
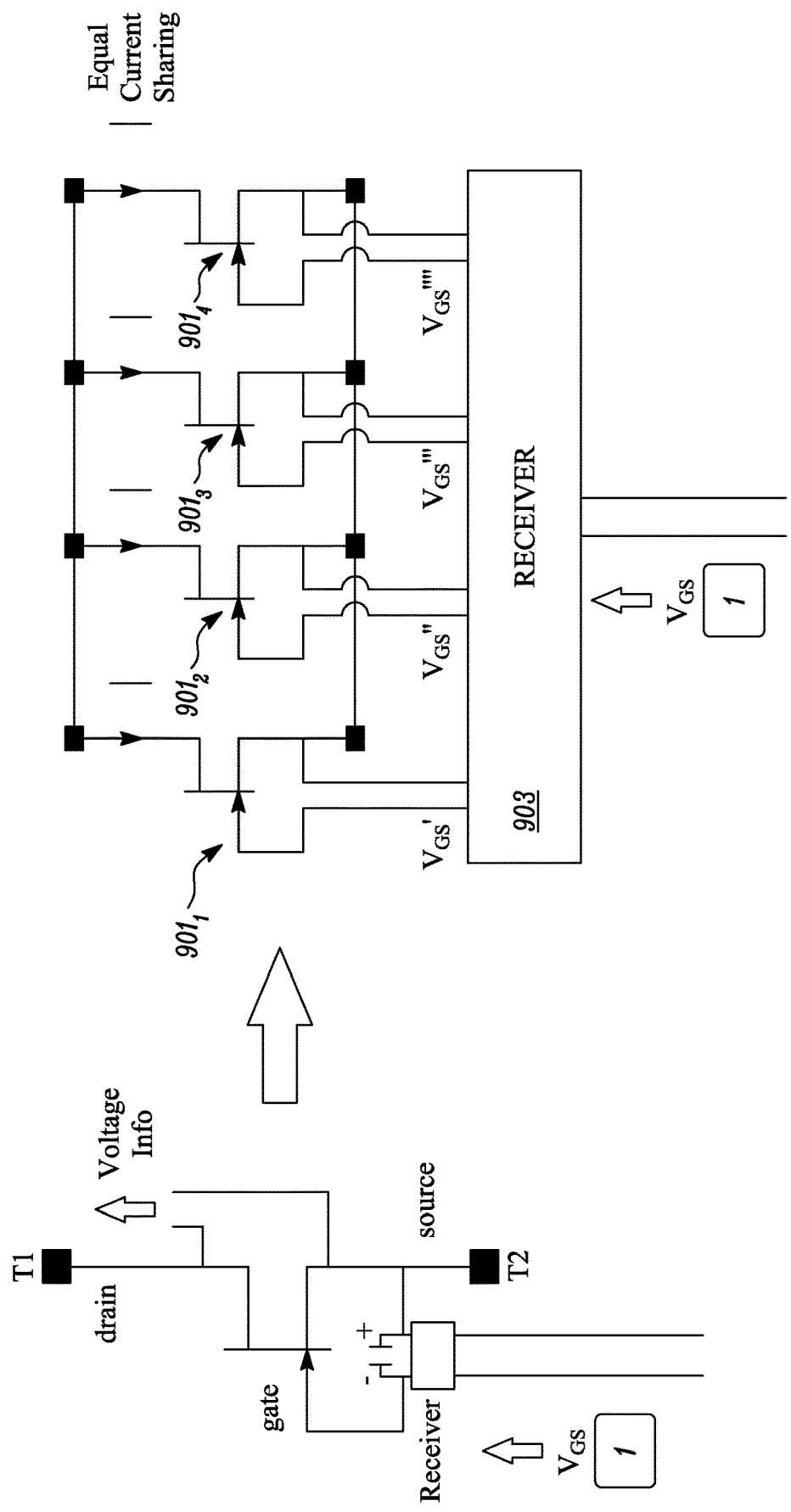
FIG. 9 is a schematic circuit diagram illustrating an arrangement of parallel connected JFET current limiting diodes with controller gate-source voltages.

FIG. 9

Where active gate control is applied to tune the current characteristic of a CLD being formed from a number of parallel dies, the gate to source voltage applied to each parallel device could in practice be slightly different. This may be used to ensure that each parallel device conducts the same or similar current, for example to ensure equal thermal loading, as shown in FIG. 9. In this example, the controller 802 of FIG. 8 may provide a gate-source voltage $V_{GS}$ to the receiver 903 and the receiver 903 provides individually controlled gate to source voltages $V_{GS}'$, $V_{GS}''$, $V_{GS}'''$, $V_{GS}''''$ to corresponding JFETs $901_{1-4}$ to account for differences between the JFET characteristics. Small differences in the required $V_{GS}$ could be identified at the manufacturing stage to compensate for differences of impedance of the parallel paths caused by the practical layout and wiring and minimise current sharing errors. Such an approach could also be used to slightly unbalance the currents in the parallel paths to compensate for unequal cooling of the parallel JFETs created by the practical, but inherently imperfect, heatsink design and associated thermal management system. Such differences could be programmed into the receiver 903 at the manufacturing stage to optimise the overall device and improve the expected 5-10% derating on current, as discussed above. A look-up table approach could for example be used in the receiver 903 to adjust the gate-source voltages. Alternatively, the individual $V_{GS}$ voltages could be altered dynamically in real time to control the current sharing in response to measured information on actual current flow in each path and/or the temperature of the individual JFET die or discrete sections of the overall CLD package. This is particularly important given the change in the saturation current as the parallel JFETs heat up as shown above in FIGS. 6 & 7. Commercial semiconductor power modules often include NTC (negative temperature coefficient) thermistors or other similar PTC devices to give an indication of temperature near to the semiconductor die and could be used with the CLD to alter the relative current sharing of the parallel die as required.

In CLD designs where the individual parallel JFETs are designed to safely fail to an open circuit condition, the control of $V_{GS}$ provides a way of altering the saturation characteristics to fully take into account the reduction in current capability.

By actively controlling the $V_{GS}$ voltage of each CLD independently, the CLD saturation characteristics may be dynamically altered to suit the configuration of the electrical network. This can be extended to enable JFET turn-off once a fault location is identified and enables contactor opening at zero current to provide arc free galvanic isolation.

Independent control of $V_{GS}$ of the individual parallel JFETs forming each CLD also enables current sharing errors to be minimised, which maximises the current rating of the device and avoids de-rating of the overall device. Such control can compensate for a non-ideal heatsink/thermal management system and respond in real time to reduce the current flow in JFETs with a high junction temperature or the open circuit failure of an individual JFET.

Bidirectional CLDs can be used to control both the discharging of DC capacitors during a fault and charging of DC capacitors at start-up. This means the components of the protection system can also be used to soft-start the DC link capacitors of the power electronic converters at power-up, which removes the need for resistors & contactors that may normally be used.

CLDs effectively instantaneously introduce resistance into the DC network and can prevent L-C oscillations and the reversal of voltage across the DC network. Such oscillations are known to cause problems if converter diodes are forced into conduction and pick up fault current.

Figure 10:
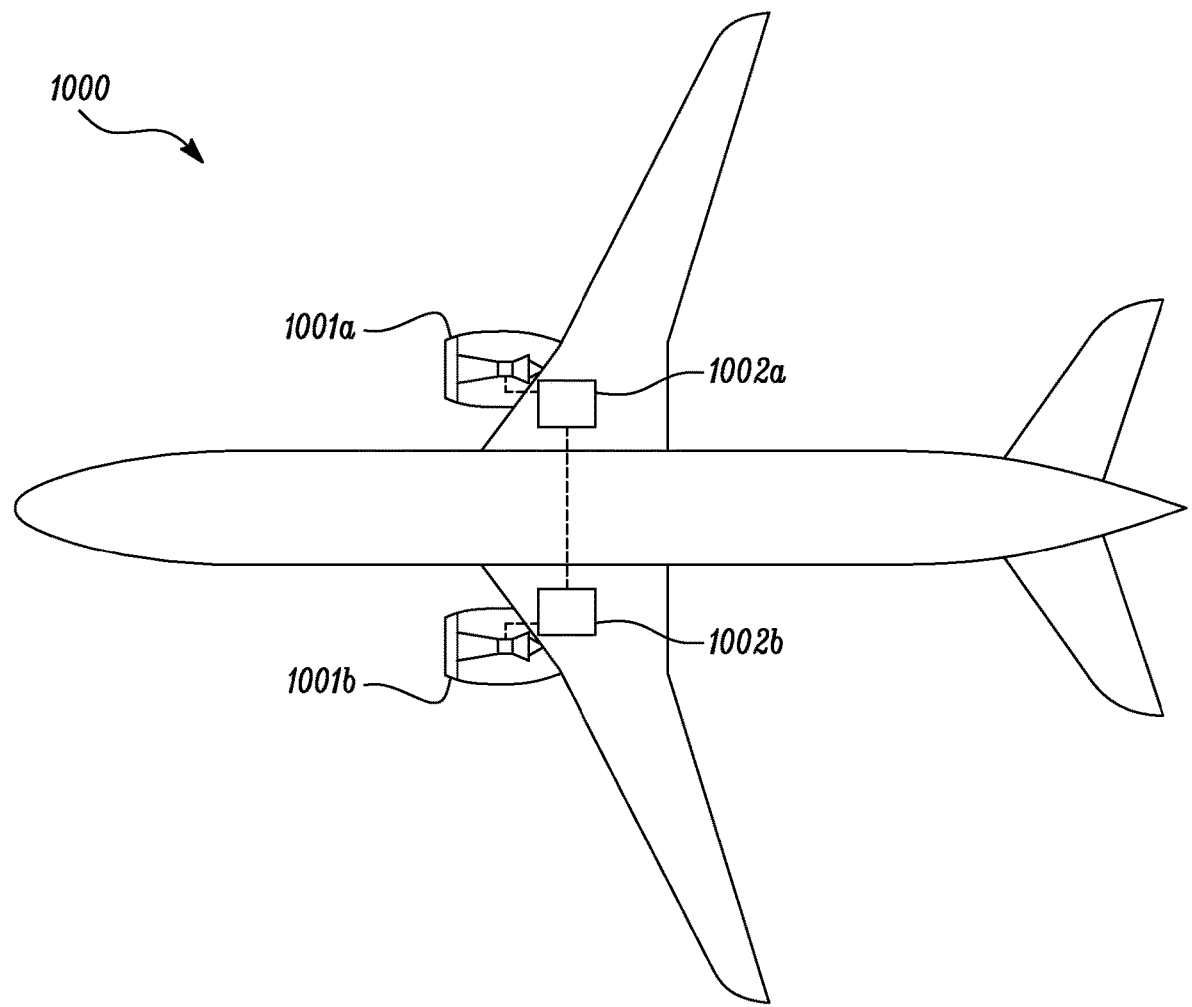
FIG. 10 is a schematic drawing of an example aircraft comprising gas turbine engines and electrical power systems.

The electrical power system 600 described herein may be incorporated into an aircraft power and propulsion system such as the system 200 of FIG. 2, the electrical machine 601 of the electrical power system 600 being mechanically coupled with a spool of the gas turbine engine 201.
FIG. 10

As described above, the electrical power system described herein may be part of an aircraft power and propulsion system. The aircraft 1000 comprises gas turbine engines 1001a, 1001b, one or both of which may comprise or be connected to an electrical power system 1002a, 1002b of the type as described above. Each of the gas turbine engines 1001a, 1001b may be as described above in relation to FIG. 1. The aircraft 1000 may be a hybrid electric aircraft.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the electric machine drive techniques described herein could be used for many other applications. These include, but are not limited to, automotive, marine and land-based applications.

The invention claimed is:

1. An electrical power system comprising:
   an electrical machine;
   an AC:DC power electronics converter connected to receive an input AC supply from the electrical machine and provide an output DC supply across first and second output terminals;
   a DC bus connected to the first and second output terminals of the AC:DC power electronics converter;
   a load connected across the DC bus;
   a first circuit breaker switch and a first current limiting diode connected in series between the AC:DC power electronics converter and the DC bus; and
   a second circuit breaker switch and a second current limiting diode connected in series between the DC bus and the load,
   wherein the first current limiting diode is configured to limit current to a higher level than the second current limiting diode.

2. The electrical power system of claim 1, comprising a controller configured to measure a voltage across the first and second current limiting diodes and operate the first and second circuit breaker switches dependent on the measured voltage across the first and second current limiting diodes.

3. The electrical power system of claim 2, wherein the controller is configured to open the first circuit breaker switch if the measured voltage across the first current limiting diode exceeds a first threshold voltage and to open the second circuit breaker switch if the measured voltage across the second current limiting diode exceeds a second threshold voltage.

4. The electrical power system of claim 2, wherein the first and second current limiting diodes each comprise one or more JFETs.

5. The electrical power system of claim 4, wherein the controller is configured to measure a drain-source voltage across each of the one or more JFETs.

6. The electrical power system of claim 4, wherein each of the first and second current limiting diodes comprises a plurality of JFETs connected in parallel.

7. The electrical power system of claim 4, wherein the controller is configured to provide a gate-source voltage to each of the one or more JFETs of each of the first and second current limiting diodes.

8. The electrical power system of claim 1, wherein the first and second current limiting diodes are unidirectional or bidirectional current limiting diodes.

9. A method of operating an electrical power system comprising:
   an electrical machine;
   an AC:DC power electronics converter connected to receive an input AC supply from the electrical machine and provide an output DC supply across first and second output terminals;
   a DC bus connected to the first and second output terminals of the AC:DC power electronics converter;
   a load connected across the DC bus;
   a first circuit breaker switch and a first current limiting diode connected in series between the AC:DC power electronics converter and the DC bus; and
   a second circuit breaker switch and a second current limiting diode connected in series between the DC bus and the load the first current limiting diode being configured to limit current to a higher level than the second current limiting diode,
   the method comprising:
   measuring a voltage across the first and second current limiting diodes;
   opening the first circuit breaker switch if the measured voltage across the first current limiting diode exceeds a first threshold voltage; and
   opening the second circuit breaker switch if the measured voltage across the second current limiting diode exceeds a second threshold voltage.

10. The method of claim 9, wherein the electrical power system comprises a controller configured to measure the voltage across the first and second current limiting diodes and to operate the first and second circuit breaker switches dependent on the measured voltage across the first and second current limiting diodes.

11. The method of claim 10, wherein the first and second current limiting diodes each comprise one or more JFETs.

12. The method of claim 11, wherein the controller measures a drain-source voltage across each of the one or more JFETs.

13. The method of claim 11, wherein each of the first and second current limiting diodes comprises a plurality of JFETs connected in parallel.

14. The method of claim 10, wherein the controller provides a gate-source voltage to each of the one or more JFETs of each of the first and second current limiting diodes.

15. The method of claim 9, wherein the first and second current limiting diodes are unidirectional or bidirectional current limiting diodes.

16. An aircraft power and propulsion system comprising:
a gas turbine engine; and
an electrical power system according to claim 1,
wherein the electrical machine of the electrical power system is mechanically coupled with a spool of the gas turbine engine.

17. An aircraft comprising the electrical power system of claim 1.

18. The aircraft of claim 17, wherein the aircraft is a hybrid electric aircraft.

19. An electrical power system comprising:
an electrical machine;
an AC:DC power electronics converter having an AC side and a DC side, the AC side connected to the electrical machine and the DC side connected across first and second terminals;
a DC bus connected to the first and second terminals of the AC:DC power electronics converter;
a load connected across the DC bus;
a first circuit breaker switch and a first current limiting diode connected in series between the AC:DC power electronics converter and the DC bus; and
a second circuit breaker switch and a second current limiting diode connected in series between the DC bus and the load,
wherein the first current limiting diode is configured to limit current to a higher level than the second current limiting diode.

* * * * *